United States Patent
Kaplan

(10) Patent No.: US 12,511,561 B2
(45) Date of Patent: Dec. 30, 2025

(54) METHOD FOR SECURELY COMPUTING A LOGICAL AND BETWEEN TWO BITS USING QUANTUM COMMUNICATION

(71) Applicant: VERIQLOUD, Montrouge (FR)

(72) Inventor: Marc Kaplan, Montrouge (FR)

(73) Assignee: VERIQLOUD, Montrouge (FR)

( * ) Notice: Subject to any disclaimer, the term of this patent is extended or adjusted under 35 U.S.C. 154(b) by 709 days.

(21) Appl. No.: 17/919,812

(22) PCT Filed: Apr. 15, 2021

(86) PCT No.: PCT/FR2021/050662
§ 371 (c)(1),
(2) Date: Oct. 19, 2022

(87) PCT Pub. No.: WO2021/219947
PCT Pub. Date: Nov. 4, 2021

(65) Prior Publication Data
US 2023/0162076 A1 May 25, 2023

(30) Foreign Application Priority Data
Apr. 30, 2020 (FR) .................. 2004295

(51) Int. Cl.
*G06N 10/20* (2022.01)
(52) U.S. Cl.
CPC .................. *G06N 10/20* (2022.01)
(58) Field of Classification Search
CPC ........ G06N 10/20; G06N 10/00; G06N 99/00; H04L 29/06; H04L 9/08; H04L 63/0414;
(Continued)

(56) References Cited

U.S. PATENT DOCUMENTS 7,518,120 B2 * 4/2009 Monroe ................. H04B 10/70
398/183
7,616,765 B2 * 11/2009 Maeda ................. H04L 9/0852
380/255
(Continued)

FOREIGN PATENT DOCUMENTS

CN 108388946 A 8/2018
CN 108632261 A1 10/2018

OTHER PUBLICATIONS

International Search Report for corresponding application PCT/FR2021/050662 filed Apr. 15, 2021; Mail date Jun. 10, 2021.
(Continued)

*Primary Examiner* — Sargon N Nano
(74) *Attorney, Agent, or Firm* — CANTOR COLBURN LLP

(57) ABSTRACT

Method for computing a logical AND between two chosen bits, xi, xj, held by first and second participants, including a first phase comprising a step in which said first and second participants determine a first correlation variable and a second correlation variable, each determine a random bit, p and q, and transmit, to said server, a value dependent on said random bit p, q, a step in which the server prepares a photon in a first state; a step in which said first participant applies a first transformation V Up to said photon; a step in which the second participant applies a second transformation V Uq to said photon, and a step in which the server performs a third transformation (U*)p+q, measures the state of the photon and determines a third correlation variable; and a second phase comprising a step in which said first and second participants exchange a value u1, u2 dependent on the sum of the random bit, p, q and the chosen bit, xi, xj; and a step in which said first participant computes and delivers a first value a=+xi∧u2, said second participant computes and delivers a second value b=+xj∧u1+u1∧u2 and said server
(Continued)

delivers the third correlation value, so that the result of the computation of the logical "and" between said chosen bits may be obtained by summing said first and second values and said third correlation variable.

10 Claims, 2 Drawing Sheets

(58) Field of Classification Search
CPC . H04L 63/0428; H04L 9/0852; H04L 9/0869; H04L 2209/46
See application file for complete search history.

(56) References Cited

U.S. PATENT DOCUMENTS

| | | | | |
|---|---|---|---|---|
| 9,680,452 | B1 * | 6/2017 | Abdo | H04B 10/70 |
| 11,777,614 | B2 * | 10/2023 | Hamilton | H01Q 5/22 |
| | | | | 398/115 |
| 2011/0222848 | A1 * | 9/2011 | Lukin | H04B 10/90 |
| | | | | 257/31 |
| 2014/0068765 | A1 * | 3/2014 | Choi | H04L 63/1416 |
| | | | | 726/23 |
| 2019/0149246 | A1 * | 5/2019 | Bishop | H04B 10/70 |
| | | | | 398/25 |
| 2022/0206361 | A1 * | 6/2022 | Shen | G02F 3/00 |
| 2023/0188222 | A1 * | 6/2023 | Patel | G06N 10/20 |
| | | | | 380/256 |

OTHER PUBLICATIONS

Prof. N Sudhakar Reddy, "A Novel Hybrid Quantum Protocol to Enhance Secured Dual Partu Computation Over Cloud Networks", 2018 IEEE 8th International Advanced Computing Conference (IACC), IEE, Dec. 14, 2018, pp. 142-149, XP033538619.

Shi Run-Hua et al., "Quantum Solution to a Class of two-party private summation problems", Arxin. Org Kluwer Academic, Dordrecht, NL, vol. 16, No. 9, 28 Jul. 28, 2017, pp. 1-9, XP036304767.

* cited by examiner

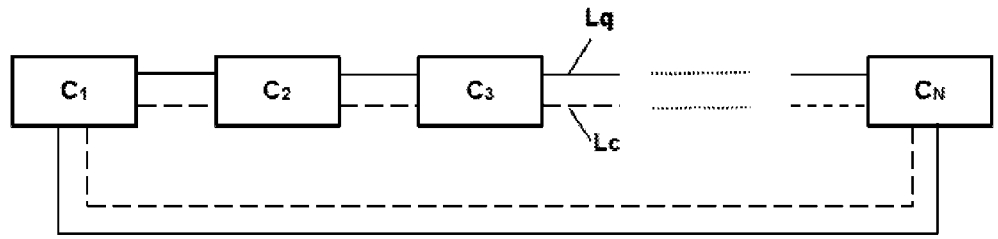
Fig. 1A
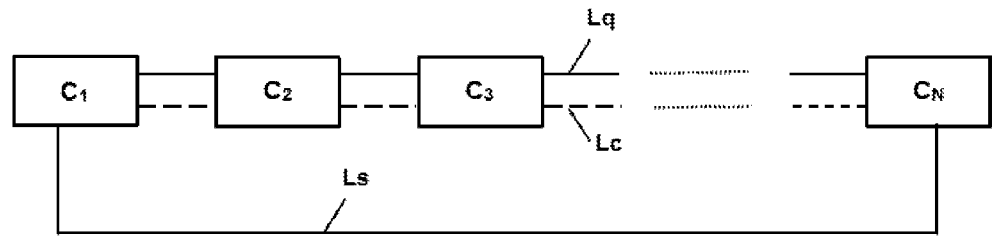
Fig. 1B
| Degree of freedom | $|0\rangle$ | $|1\rangle$ |
|---|---|---|
| Phase | Fixed phase $P_0$ | $P_0 + pi$ |
| Phase difference | 0 | Pi |
| Temporal location | Time $t_0$ | $t_0 + delta$ |
| Polarization | Horizontal | Vertical |
| Frequency | $f_1$ | $f_2$ |
Fig. 2

METHOD FOR SECURELY COMPUTING A LOGICAL AND BETWEEN TWO BITS USING QUANTUM COMMUNICATION

The present invention relates generally to the field of secure computing using quantum communications and more particularly to the computation of a logical AND between multiple participants connected to a communication network.

BACKGROUND OF THE INVENTION

Generally speaking, the invention relates to the field of secure multi-party computation, which is a branch of cryptography whose objective is to allow participants to obtain the result of a common function without any of them being able to know the inputs of the other participants.

This type of problem seems to have been raised in the 1970s in the article by A. Shamir, R. Rivest, and L. Adleman, "*Mental Poker*", Technical Report LCS/TR-125, Massachusetts Institute of Technology, April 1979. In the 1980s, the problem was applied to the theoretical problem of billionaires which consisted of determining the richest person in a set of billionaires without any of them disclosing their fortune to anyone. A notable example is the article by Andrew C. Yao, "*Protocols for secure computations*" which presents the problem and a protocol to solve it.

Other applications of secure multi-party computation include auction or voting mechanisms, statistics on medical data, etc. In these applications, generally speaking, one wants to achieve a result based on all the input data while keeping it private, that is secret from other parties. In the case of medical data, for example, it may be interesting to construct statistical or aggregate data, but for legal reasons, individual data cannot be accessible to anyone. Similarly, in auction systems, for example in a wholesale market for agricultural products, the issue is to determine which party has won the auction but without the different parties having to reveal their bids.

While there is theoretical work on secure multi-party computation, very few industrial developments exist. Indeed, privacy protection is a relatively new concern: the first large-scale implementation dates back to 2009, and the first practical solutions are necessarily coming to market with some delay.

Furthermore, existing proposals generally induce an additional cost in terms of computation time which makes them prohibitive for practical uses.

Another drawback of existing proposals is their high level of technicality, linked to cryptographic techniques, which makes them difficult to integrate into existing products and systems.

The purpose of the invention is to at least improve the situation by providing an efficient. secure multi-party computation method making use of a quantum communication channel.

More particularly, the invention concerns the sub-problem of a distributed computation of a logical AND, as this computation allows any multi-party logic functions to be carried out.

To this end, the present invention proposes a method for calculating a logical AND between two chosen bits, $x_i$, $x_j$ held by a first and a second participant, $C_i$, $C_j$ respectively, connected to each other and to a server by at least one quantum communication channel Lq and one conventional communication channel Lc, comprising a first phase using said quantum communication channel and comprising
- a first step in which said first and second participants randomly determine, respectively, a first a and second β correlation variable; each determine a random bit, respectively p and q, and transmit to said server, a value dependent on said respective random bit p, q;
- a second step in which said server prepares a photon in a first state in an orthonormal basis, and transmits it to said first participant;
- a third step in which said first participant applies a first transformation $V^\alpha U^p$ to said photon, and transmits it to said second participant, the logic gate V transforming a state into an orthogonal state and the logic gate U being a square root of the logic gate V;
- a fourth step in which said second participant applies a second transformation $V^\beta U^q$ to said photon, and transmits it to said server;
- a fifth step in which the server performs a third transformation $(U^*)^{p+q}$, measures the state of said photon and determines a third correlation variable γ based on said state, so as to form a correlation between said correlation variables; and, a second phase comprising
- a sixth step in which said first and second participants exchange a value u1, u2 depending on the sum between the random bit, p, q, and the chosen bit, $x_i$, $x_j$, they hold, respectively;
- a seventh step in which said first participant calculates and provides a first value $a=\alpha+x_i \wedge u2$, said second participant calculates and provides a second value $b=\beta+x_j \wedge u1+u1 \wedge u2$ and said server provides the third correlation variable γ,
- so that the result of the computation of the logical "AND" between said chosen bits may be obtained by summing said first and second values and said third correlation variable.

According to preferred embodiments, the invention comprises one or several of the following features which may be used separately or in partial combination with each other or in total combination with each other:
- said first phase is performed before said chosen bits are known to said participants
- in said first step, said first and second participants transmit respective values t1=p+r and t2=q+r, where r is a bit secretly shared by said first and second participants;
- said first state is the |+⟩ state
- said conventional communication channel (Lc) is a secure channel Another aspect of the invention relates to a device for calculating a logical AND between two chosen bits, $x_i$, $x_j$ held by a first and a second participants, $C_i$, $C_j$ respectively, connected to each other and to a server by at least one quantum communication channel and one conventional communication channel, comprising means for implementing the previously described method.

According to preferred embodiments, the invention comprises one or several of the following features which may be used separately or in partial combination with each other or in total combination with each other:
- said first and second participants belong to a chain of participants, wherein the two participants at the ends respectively implement said server, an upstream participant being able to emit a photon, and a downstream participant being able to receive a photon and measure its state.

said first and second participants belong to a ring of participants, such that a given participant implements said server and is able to emit a photon, receive a photon, and measure its state.

said server comprises a laser capable of generating photons and an initial modulator capable of modulating a degree of freedom of a photon generated by said laser.

said first and second participants comprise modulators capable of modulating an electromagnetic field through which the photons pass in order to modify a degree of freedom thereof.

The use of quantum communication allows an excellent level of security for a modest computational overhead. The security is perpetual because it does not rely on the solving of computational problems. Thus, it is not possible to record the communication to break the protocol later, in the future. The computational overhead for an AND is not very large: a few qubit exchanges.

DESCRIPTION OF THE FIGURES

FIGS. 1a and 1b show two variations of an example architecture of a device for secure multi-party computation according to an embodiment of the invention.

FIG. 2 shows in table form several examples of degrees of freedom for quantum bit encoding.

DESCRIPTION OF IMPLEMENTATIONS OF THE INVENTION

Figure 3:
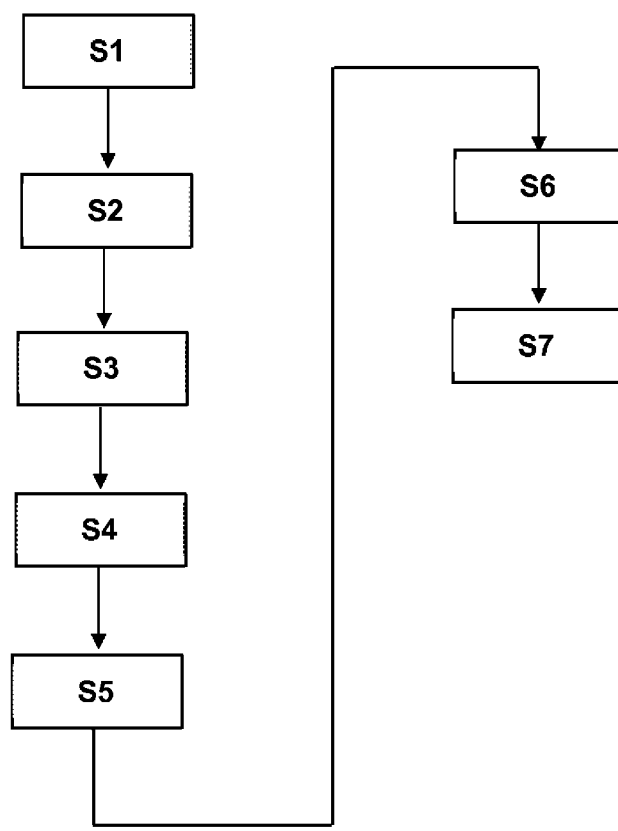
FIG. 3 shows an embodiment of the method, or protocol, for secure multi-party computation of the logical "AND" in which the main steps are shown.

As discussed in the introduction, one of the purposes of the invention is to enable secure multi-party computation between a set of participants.

According to one embodiment, these participants can be organized in a chain as shown in FIG. 1b or in a ring as shown in FIG. 1a.

The N participants $C_1, C_2, C_3 \ldots C_N$ can communicate with their immediate neighbors only and through at least two communication channels: a quantum communication channel Lq and a classical, or conventional, communication channel LC.

This conventional communication channel Lc can be secured. The security can be achieved for example through the quantum communication channel which allows the exchange of encryption keys with unconditional security. It can be of different types, depending on the embodiments. Typically, it can be a digital communication channel compliant with the TCP/IP protocol stack. It can be a wired channel (Ethernet, etc.) or wireless (WiFi, cellular, etc).

According to another embodiment, the conventional communication channel Lc can be of the "broadcast" type. Thus, all participants receive data from all participants. However, the security by exchanging encryption keys can be peer-to-peer, so that the conventional "physical" communication channel Le supports a set of peer-to-peer "logical" communication channels, connecting each of the participants to its neighbors.

In practice, the participants can be of various types: they can be computers connected to a communication network, or virtual machines deployed on a server or on a server farm, etc.

The quantum communication channel Lq can be implemented in different ways as well.

According to one embodiment, the quantum communication channel Lq is provided to allow the transmission of light signals enabling the transport of quantum bits, generally called "qubits". It is typically an optical fiber.

Quantum bits can be encoded with photons according to their degree of freedom. "Photon degree of freedom" refers to a physical property described by quantum mechanics and usable for quantum communications. Examples of photon degrees of freedom are phase, phase difference, frequency, polarization or temporal location. In this description, we use the formalism that represents a quantum state as a vector $|\alpha\rangle$ in a d-dimensional Hilbert vector space. The concept of Hilbert vector space extends the methods of linear algebra by generalizing the notions of Euclidean space (like the Euclidean plane or the usual space of dimension 3) and Hermitian space to spaces of any dimension (finite or infinite). A vector $|\alpha\rangle$ of a d-dimensional Hilbert vector space can be described via a basis of the d-dimensional Hilbert vector space.

FIG. 2 gives examples of photon degrees of freedom, in a 2-dimensional Hilbert vector space.

A first participant $C_1$ is intended to emit the photons, which will be transmitted from one to the next along the chain.

According to a chain embodiment, as shown in FIG. 1b, this transmission is performed to the most downstream participant $C_N$ in the chain which may be provided to perform measurements of the photon states and thus read the states of the associated qubits. This participant $C_N$ is intended to communicate with participant $C_1$ through a secure communication channel $L_s$.

According to a ring embodiment, as shown in FIG. 1a, the transmission is performed up to the first participant $C_1$. As we shall see, this first participant thus plays the roles of sender and receiver.

The first participant $C_1$ can be called the "sender". In practice, it can be implemented in different ways. For example, it may comprise a laser capable of generating photons and an initial modulator capable of modulating a degree of freedom of a generated photon.

According to one embodiment, a modulation is carried out on the time interval for which a photon is to be generated, the overall energy of which corresponds to a photon energy quantum.

According to another embodiment, the phase difference is used as a degree of freedom to encode the qubits. Also, the sender $C_1$ generates the photons by modulating them according to two peaks, each in a half-interval of the interval corresponding to the photon to be generated. The total energy of this modulation being, by configuration, equal to the energy quantum of a photon, each photon thus generated is a superposition of a photon between these two half-intervals.

The laser can be provided with a wavelength of 1550 nm which corresponds to the minimum attenuation in optical fibers commonly used in telecommunications.

The N-2 participants besides the endpoint participants $C_1$, $C_N$ are modulators. They are not designed to emit photons but only to modulate an electromagnetic field in which the photons pass in order to modify one of their degrees of freedom.

According to one embodiment (FIG. 1b), the most downstream participant $C_N$ in the chain can be called a receiver. According to another embodiment (FIG. 1a), the participant $C_1$ is both a sender and a receiver.

The receiving participant, $C_1$, $C_N$, may comprise a single photon detector. Different mechanisms exist in the prior art. For example, there are detectors based on avalanche photodiodes (APDs).

It is possible to set up bidirectional communication channels, so that quantum bits (or qubits) can be transmitted in both directions of the chain. In such a case, the sender $C_1$ can also be a receiver, that is it can have measuring means (single photon detector).

Depending on the type of degree of freedom, different types of modulators and detectors can be used by the participants $C_1, C_2, C_3 \ldots C_N$.

When the degree of freedom of photons to encode quantum bits is the phase, the modulators can be phase modulators. For example, the LN53S-FC or LN65S-FC model marketed by Thorlabs can be used.

When the degree of freedom of photons to encode quantum bits is photon polarization, the modulators can be polarization modulators. For example, a model from the PSC-LN series of products marketed by iXblue Photonics can be used.

When the degree of freedom of the photons to encode the quantum bits is the temporal location of the photons, the modulators may each comprise a number d of delay lines and a number 2d of splitter plates, where d represents the dimension of the Hilbert vector space of representation of the quantum states. The superposition of temporal locations to be realized to create an incompatible base can be obtained by programming the splitter plates.

The same principle can be used for detection by the receiver $C_N$. This can have only one single photon detector, downstream of a similar device allowing to separate the beams and to delay the beams differently so that after recombination of the beams, the instant of the detection of the photon makes it possible to determine the temporal location of that photon.

This architecture can be used for secure multi-party computation between participants.

It is known that any computation on binary data can be reduced to a combination of universal logical operators. These universal logical operators are "NAND" (for "Not And") and "NOR" (for "Not Or").

Carrying out a logical "NOT" operator does not pose any particular problem of security since it is a local operator. On the other hand, the logical operators AND OR can involve several participants and thus imply a security problem to make it possible to obtain the result of the operation without any of the participants knowing the value held by the other participants.

It is more common to use the "NOT AND" operator. Also, the invention addresses the particular sub-problem of computing a logical AND between multiple participants. More specifically, it deals with the computation of a logical AND between two participants, it being understood that switching to more than two participants amounts to combining several "AND" operators.

In the following we will denote $x_i \wedge x_j$ the logical "and" operation between the bits $x_i$ and $x_j$.

The invention thus aims to calculate a logical AND between bits $x_i$ and $x_j$ held by two participants, $C_i$ and $C_j$ respectively, where $1 \leq i \leq N$ and $1 \leq j \leq N$ and, of course, $i \neq j$, with the constraints that Participant $C_i$ should not be able to learn more information than the values of bit $x_i$ and $x_i \wedge x_j$ (indeed, it should not be able to know the value of bit $x_j$), participant $C_j$ should not be able to learn more information than the values of bit $x_j$ and of $x_i \wedge x_j$ (indeed, it should not be able to know the value of bit $x_i$), no other party to the computation should be able to know either $x_i$ or $x_j$.

We will call these two bits $x_i$ and $x_j$, "chosen bits".

Especially, the method according to the invention involves a third party, called server in the following. This server may know the final result $x_i \wedge x_j$ but must not know the value of $x_i$ nor the value of $x_j$. This server also has the function of creating and emitting a photon in a given state, and can therefore be implemented, at least partially, by the sender $C_1$.

According to a first embodiment based on a ring architecture (FIG. 1a), participant $C_1$ is also a receiver, so that the server has all the information directly at its disposal as sender and receiver.

According to a second embodiment based on a chain architecture (FIG. 1b), the server can have the information received by the receiver $C_N$ via a secure communication channel $L_s$. In a way, the server is then implemented by the pair $C/C_N$ formed by the two participants located at the ends of the chain of participants.

Even more implementations are possible. In the following, for simplicity, we will assign the reference $C_1$ to the server.

In a very general way, this computation is based on correlation, known as "magic", between three binary variables $\alpha$, $\beta$ $\gamma$ each determined, respectively, by the two participants $C_i$, $C_j$ and the server $C_1$ and corresponding to a logical "and" between two bits $b_1$, $b_2$ held by the participants so that $\alpha+\beta+\gamma=b_1 \wedge b_2$. Furthermore, the marginal distributions of the three variables $\alpha$, $\beta$ $\gamma$ must satisfy the uniformity criterion: when viewed individually, each bit can equiprobably take the value 0 or 1. In the following, we will call these three variables "correlation variables".

A first phase consists of establishing a magic correlation corresponding to the logical "and" between two random bits and using the quantum communication channel $L_q$ and quantum computation. At the end of this first phase, we therefore determine the three variables $\alpha$, $\beta$, $\gamma$ forming the magic correlation.

A second phase is to use this magic correlation ($\alpha$, $\beta$ $\gamma$) to compute the logical "and" between the two chosen bits $x_i$, $x_j$, that is, the final result sought, using a conventional secure communication channel, Lc.

In the first phase, participants $C_i$ and $C_j$ will apply quantum gates, U and V, to input qubits in order to generate output qubits.

The quantum gate V transforms the state (or qubit) of a photon into an orthogonal state, in any orthonormal basis. The quantum gate U corresponds to a square root of the transformation performed by the quantum gate V.

On the Bloch sphere, these operations are therefore equivalent to saying that the whole quantum part is defined to within one rotation.

The qubit is generated by the server $C_1$, in a first state, in an orthonormal basis.

According to an embodiment, this first state is denoted $|+>$. This notation is, however, arbitrary, since it is sufficient, according to the invention, to have any two orthogonal states, but it allows for clearer description.

In the following, we will denote as $|0>$ and $|1>$ two orthogonal states (that is perfectly distinguishable) among the quantum degrees of freedom of the emitted photon in this orthonormal basis.

We denote as $|+\rangle$ and $|-\rangle$ two states formed by the superposition of these two orthogonal qubits. We can write:

$$|+\rangle = \frac{1}{\sqrt{2}}(|0\rangle + |1\rangle)$$

We can also write $$|-\rangle = \frac{1}{\sqrt{2}}(|0\rangle - |1\rangle)$$

The gate V is a Pauli-Z gate which is equivalent to a rotation around the Z-axis of the Bloch sphere by $\pi$ radians. It can be represented by the Pauli-Z matrix:

$$z = \begin{bmatrix} 1 & 0 \\ 0 & -1 \end{bmatrix}$$

In other words, such a gate V transforms the state $|+\rangle$ into the state $|-\rangle$, and, reciprocally the state $|-\rangle$ into the state $|+\rangle$ As said before, the gate U is a square root of the gate V. According to one embodiment, it may be a rotation about the Z axis of the Bloch sphere by $\pi/2$ radians. In other words, by applying the U gate twice, we obtain the equivalent of a V gate.

In an embodiment of encoding phase difference information, the qubit $|+\rangle$ may correspond to a photon in uniform superposition over these two half-intervals. In this case, the rotations U and V correspond to a phase shift of the 2nd half-interval of $\pi$ and $\pi/2$, respectively.

In all the cases described above and in general, the implementations are carried out by applying an appropriate modulation.

Also of interest is the paper by Marco Clementi, Anna Pappa, Andreas Eckstein, Ian Walmsley, Elham Kashefi, et al, "*Classical multiparty computation using quantum resources*" in Physical Review A, American Physical Society, 2017, 96 (6), pp. 062317. (10.1103/PhysRevA.96.062317). (hal-02164423). In this paper, the states $|+\rangle$ and $|-\rangle$ are implemented using vertical and horizontal polarizations. The rotations U and V are implemented with half-wave plates.

FIG. 3 shows an embodiment of the method, or protocol, for secure multi-party computation of the logical "AND" in which the main steps are shown. FIG. 3 is a purely illustrative flowchart and the sequence of steps can be understood without recourse to this flowchart, just as other sequences, or other divisions into steps, are possible and accessible to the skilled person.

In this example, it is assumed that two participants $C_i$ and $C_j$ have, at a given time, two bits, respectively $x_i$ and $x_j$ whose logical "and" is to be calculated.

In a step S1, each participant $C_i$, $C_j$ determines, for example randomly, a value for its respective correlation variable $\alpha$, $\beta$ intended to form a magic correlation. Each participant also determines the value of two other bits, p and q respectively, also at random. These 4 random bits $\alpha$, $\beta$, p, q can be determined in this preliminary step S1 or later, before these bits are needed in the computations required by the subsequent steps of the protocol.

In a step S2, the server $C_1$ prepares and sends a photon in a superposition state of orthogonal states in a given orthonormal basis.

According to one embodiment, the server $C_1$ prepares and transmits a $|+\rangle$ state which is a uniform superposition of two $|0\rangle$ and $|1\rangle$ states, to the first participant $C_i$. According to another embodiment, the server $C_1$ prepares and sends a $|-\rangle$ state. As said above, the initial state itself does not matter, it is only important that the transformation V transforms this state into an orthogonal state.

Note that the two participants are interchangeable, since the logical "and" is a commutative operation. Therefore, the terms "first" and "second" participants are only used to distinguish them, for the clarity of the description, without establishing any order or hierarchy between them.

In a step S3, the first participant $C_i$ receives this state of the photon and applies to it a first quantum transformation formed by the succession of quantum gates performing a rotation of angle n around the Z-axis and the other a rotation of angle $\pi/2$ around the Z-axis, this transformation depending on the two random bits determined by this first participant, that is a et p.

More precisely, this first transformation can be written $V^\alpha U^p$.

This notation $T^e$ means that if the exponent e is equal to 1, we apply the transformation T and if it is equal to 0, we do not apply it.

The first participant $C_1$ can then send the qubit resulting from this transformation in the quantum communication channel $L_q$ to the second participant $C_j$.

In a step S4, the second participant $C_j$ performs a similar transformation but based on the two random bits at its disposal: $\beta$ and q. This second transformation can be written $V^\beta U^q$. The qubit resulting from this transformation can then be sent in the quantum communication channel $L_q$ to the server $C_1$.

In a step S5, the server $C_1$ performs a third transformation which can be written as $(U^*)^{p+q}$, where $U^*$ is the inverse transformation of U.

According to the invention, the value p+q is transmitted to the server $C_1$, without communicating the individual values of p and q.

According to a preferred mode of implementation of the invention, the protocol is secured by secretly sharing a bit r between the two participants $C_i$ and $C_j$ in order to encode the communication of bits p and q to the server $C_1$. Also, during step S1 (which can be extended to this step S4), the participant $C_i$ sends to the server $C_1$ the bit t1=p+r over a secure channel;
the participant $C_j$ sends to the server $C_1$ the bit t2=q+r over a secure channel.

Other secure methods can be used to transmit the value of t1+t2 to the server $C_1$, as will be seen later.

The sign "+" indicates binary addition. Since we are only interested in a single bit, this operation is equivalent to an "exclusive or"

The server $C_1$ can then calculate the third transformation $(U^*)^{t1+t2}$

After this transformation, the state of the qubit is: $(U^*)^{t1+t2} \cdot V^\beta U^q V^\alpha U^p |+\rangle$ This expression can be simplified, depending on the different values that the random bits p and q can take (due to the commutativity of the ports U, V and $U^*$) into:

$V^\beta V^\alpha |+\rangle$ if p=0 and q=0
$V^\beta V^\alpha |+\rangle$ if p=0 and q=1
$V^\beta V^\alpha |+\rangle$ if p=1 and q=0
$V^\beta V^\alpha |-\rangle$ if p=1 and q=1

Here we can recall that the gate V amounts to swapping the $|+\rangle$ and $|-\rangle$ states, so that the number of swaps depends on the value of the correlation values $\alpha$ and $\beta$.

We can therefore write the following truth table:

| α | β | $V^\beta V^\alpha$ |+> | α + β |
|---|---|---|---|
| 0 | 0 | |+> | 0 |
| 0 | 1 | |-> | 1 |
| 1 | 0 | |-> | 1 |
| 1 | 1 | |+> | 0 |

The server $C_1$ then measures the received qubit in the {|+>, |->} base, and determines the value of its correlation variable γ as follows:
 if the measure is |+>, then γ=0
 if the measure is |->, then γ=1
 From then on, we can notice that γ=α+β+(pΛq).
 In other words, α+β+γ=pΛq This expression is that of a magic correlation between the three correlation variables α, β, γ, the binary sum of which is used to calculate the logical "and" of the two bits p and q.

Once this correlation is established, it allows us to calculate, in a second phase, the logical "and" for other bits, and in particular the chosen bits $x_i$, $x_j$.

It is noteworthy that this first phase is independent of the chosen bits $x_i$, $x_j$.

According to one embodiment, the first steps S1, S2, S3, S4, S5 constituting a first phase, can be carried out upstream of the moment when the participants $C_i$ and $C_j$ have the respective bits $x_i$, $x_j$ whose logical "and" is to be calculated. In other words, this first phase can be precomputed, so as to reduce the computations to be performed between the moment when the bits $x_i$ and $x_j$ are known and the result is made available, $x_i \Lambda x_j$.

This type of implementation allows significant gains in performance and security.

In a step S6, the participants $C_i$, $C_j$ exchange a value depending on the sum between the random bit, respectively p, q, and the chosen bit, respectively $x_i$, $x_j$.
 For example,
  the first participant $C_i$ calculates u1=p+$x_i$ and sends it to the second participant $C_j$.
  the second participant $C_j$ calculates u2=q+$x_j$ and sends it to the first participant $C_i$.

In a step S7, both participants $C_i$, $C_j$ and the server $C_1$ each separately provide a value, a, b, c, respectively, such that a+b+c=$x_i \Lambda x_j$.
 More precisely,
  the first participant computes and provides a=α+$x_i \Lambda$ u2
  the second participant computes and provides b=0+$x_j \Lambda$ u1+u1 Λ u2
  the server provides c=γ

The values of u1 and u2 are random and are shared among the participants beforehand. This sharing can be done through the conventional secure communication channel Lc.

It may then be verified that a+b+c=$x_i \Lambda x_j$, which is the desired result.
Indeed, $$a + b + c = \alpha + x_i \Lambda u2 + \beta + xj \Lambda u1 + u1 \Lambda u2 + \gamma$$
$$= \alpha + x_i \Lambda (q + x_j) + \beta + x_j \Lambda (p + x_i) +$$
$$(p + x_i) \Lambda (q + x_j) + \gamma$$
$$= \alpha + \beta + \gamma + x_i \Lambda q + x_i \Lambda x_j + x_j \Lambda p +$$

-continued
$$x_j \Lambda x_i + p \Lambda q + p \Lambda x_j + x_j \Lambda q + x_i \Lambda x_j$$
$$= p \Lambda q + x_i \Lambda q + x_i \Lambda x_j + x_j \Lambda p + x_j \Lambda x_i +$$
$$p \Lambda q + p \Lambda x_j + x_j \Lambda q + x_i \Lambda x_j$$

Identical terms cancel each other out since they are binary additions on a single bit (without a carry), thus equivalent to an exclusive "or". Therefore, this expression can be simplified, effectively, into a+b+c=$x_i \Lambda x_j$ One can thus obtain, by this simple binary sum of independent terms, the value of the logical "and" between the bits $x_i$ and $x_j$ chosen respectively by the first participant $C_i$, and the second participant $C_j$ without their value being known by another entity than the one that chose it. Thus, the desired property of secure multi-party computation is ensured.

Moreover, in the case where the first phase (quantum) is carried out in advance, the phase of effective computation of this "logical and" (second phase) is very effective since it only involves a double exchange between the two participants (step S6), bit additions and the provision of the values a, b, c which can simply be summed to obtain the result.

According to one embodiment of the invention, the security of the method can be enhanced in various ways.

The conventional communication channel Lc can be secured by conventional or quantum means.

As previously described, a bit r can be shared secretly between the participants and the server. This bit can be shared using a quantum key distribution, for example.

Quantum key security mechanisms are known per se, and there are various commercial devices to perform this step. Among others, mention may be made of the devices "Cerberis3 QKD System" marketed by ID Quantique, "QKD System" marketed by Toshiba, or "Quantum Key Distribution (QKD)" from Quintessence Labs.

Another example is the patent application FR1909839 entitled "Method for secure transmission of quantum state sequences between multiple online participants over a quantum communication channel".

Also, a different bit, r1, r2, r3 can be shared between each pair of the set constituted by the participants and the server. Thus, the first participant $C_i$ and the server $C_1$ exchange a first bit r1; the second participant $C_j$ and the server $C_1$ exchange a second bit r2, and the first and second participants exchange a third bit r3.

During the initialization phase S1, it is then possible to have:
 The first participant $C_i$ send to the server $C_1$ the value t1'=p+r1+r3
 The second participant $C_j$ send to the server $C_1$ the value t2'=q+r2+r3
 The server $C_1$ can then form the values t1=t1'+r1 and t2=t2'+r2

The computation of a binary logical "and" can be applied to solve any computational problem distributed between the two participants $C_i$, $C_j$.

In the case of an application to an auction mechanism, it is assumed that each of the participants $C_i$, $C_j$ holds two numbers, respectively $x_i$, $x_j$, of n bits each and representing a bid value: $x_{jj} \in \{0,1\}^n$ For two binary inputs a, b, we define the function f(a,b)=1+aΛ(1+b). This function takes the value 1 if b≥a, and 0 otherwise.

This function can be calculated, for one bit, according to the method previously described. Indeed, noting that 1+b is a logical NOT, this function is calculated as f(a,b)=NOT(a and (NOT b))

It is then possible to determine the winner between two bids in the auction by performing a bit-by-bit comparison of the two values $x_i$, $x_j$ starting from the most significant bit, and using this comparison function f for each bit.

If f returns 0 for one bit, then $x_i>x_j$ and $C_i$ carries the bid over $C_j$; otherwise $x_j \geq x_i$ and the bid is either carried by $C_j$ or both participants have made the same bid.

By doing this computation in both directions, that is also by swapping $x_i$ and $x_j$ for the second computation, it can be determined in all situations which of the participants won the auction.

The invention claimed is:

1. A method for calculating a logical AND between two chosen bits, $x_i$, $x_j$ held by a first and a second participants, $C_i$, $C_j$ respectively, connected to each other and to a server ($C_1$), by at least one quantum communication channel (Lq) and one conventional communication channel (Lc), comprising a first phase using said quantum communication channel and comprising a first step (S1) wherein said first and second participants randomly determine, respectively, a first $\alpha$ and second $\beta$ correlation variable; they each determine a random bit, respectively p and q, and transmit to said server ($C_1$), a value dependent on said respective random bit p, q;

a second step (S2) wherein said server ($C_1$) prepares a photon in a first state in an orthonormal basis, and transmits it to said first participant (Ci);

a third step (S3) wherein said first participant ($C_i$) applies a first transformation $V^\alpha U^p$ to said photon, and transmits it to said second participant ($C_j$), the logic gate V transforming a state into an orthogonal state and the logic gate U being a square root of the logic gate V;

a fourth step (S4) wherein said second participant ($C_j$) applies a second transformation $V^\beta U^q$ to said photon, and transmits it to said server;

a fifth step (S5) wherein the server $C_1$ performs a third transformation $(U^*)^{p+q}$, measures the state of said photon and determines a third correlation variable $\gamma$ based on said state, so as to form a correlation between said correlation variables; and, a second phase comprising a sixth step (S6) wherein said first and second participants exchange a value u1, u2 depending on the sum between the random bit, p, q, and the chosen bit, $x_i$, $x_j$, they hold, respectively;

a seventh step (S7) wherein said first participant calculates and provides a first value $a=\alpha+x_i \Lambda u2$, said second participant calculates and provides a second value $b=\beta+x_j \Lambda u1+u1 \Lambda u2$ and said server provides the third correlation variable $\gamma$, so that the result of the computation of the logical "and" between said chosen bits can be obtained by summing said first and second values and said third correlation variable.

2. The method according to claim 1, wherein said first phase is carried out before said chosen bits are known to said participants.

3. The method according to claim 1, wherein in said first step (S1) said first and second participants transmit respective values t1=p+r and t2=q+r, where r is a bit secretly shared by said first and second participants.

4. The method according to claim 1, wherein said first state is the |+> state.

5. The method according to claim 1, wherein said conventional communication channel (Lc) is a secure channel.

6. A device for calculating a logical AND between two chosen bits, $x_i$, $x_j$ held by a first and a second participants ($C_i$, $C_j$ respectively), connected to each other and to a server ($C_1$), by at least one quantum communication channel (Lq) and one conventional communication channel (Lc), comprising means for implementing the method according to claim 1.

7. The device according to claim 6, wherein said first and second participants belong to a chain of participants, wherein the two participants at the ends ($C_1$, $C_N$ respectively) implement said server, an upstream participant being able to emit a photon, and a downstream participant ($C_N$) being able to receive a photon and measure its state.

8. The device according to claim 6, wherein said first and second participants belong to a ring of participants, such that a given participant ($C_1$) implements said server and is able to emit a photon, receive a photon, and measure its state.

9. The device according to claim 6, wherein said server comprises a laser adapted to generate photons and an initial modulator adapted to modulate a degree of freedom of a photon generated by said laser.

10. The device according to claim 6, wherein said first and second participants comprise modulators capable of modulating an electromagnetic field through which the photons pass in order to change a degree of freedom thereof.

* * * * *